United States Patent Office 3,105,792
Patented Oct. 1, 1963

3,105,792
STABLE EFFERVESCENT COMPOSITIONS AND METHOD OF PREPARING SAME
Barry White, Baltimore, Md., assignor to Warner-Lambert Pharmaceutical Company, Morris Plains, N.J., a corporation of Delaware
No Drawing. Filed Nov. 29, 1960, Ser. No. 72,286
13 Claims. (Cl. 167—57)

This invention relates to the production of effervescent compositions and relates more particularly to improved effervescent compositions for the production of compressed tablets of enhanced chemical stability as well as of increased physical resistance to chipping, cracking and the like during packaging operations.

In the production of effervescent compositions which produce a lively effervescence when added to water the basic mixture employed comprises a combination of alkali metal carbonates or bicarbonates, such as the sodium, potassium or calcium compounds, singly or in admixture, together with a non-toxic dry organic acid such as tartaric, citric or malic acid, or with a mixture of these acids. Various therapeutic and flavoring ingredients may be added to this mixture depending upon the specific type of product involved. Thus, for example, when effervescent therapeutic compositions are desired these mixtures may contain aspirin, acetyl p-aminophenol, sodium bromide, potassium bromide and caffeine as well as various other therapeutic ingredients which are to be administered in the form of an aqueous carbonated drink. Flavoring and sweetening agents may also be added. Where only a flavored carbonated beverage is desired the therapeutic ingredients are omitted and only the flavoring and sweetening agents included in the basic effervescent composition. Effervescent compositions for other uses such as denture cleansers, bath salts and sanitary disinfectants for cleaning the irregular surfaces of sanitary equipment have also been proposed.

While the above effervescent compositions may be employed in the form of a free-flowing powder or a granulated mixture the most convenient forms from the dosage or application point of view are tablets which are usually formed by compression methods. When dropped into water the acid or acids present react with the carbonate or bicarbonate to release carbon dioxide which produces the desired effervescence.

To form tablets from an effervescent mixture such as that described above, the mixture must usually be in granular form in order that it will be sufficiently free-flowing to be easily fed to the die cavity of the tableting machine employed for shaping the tablets. Powders do not flow freely and these powders must be granulated in some convenient fashion. The usual methods of preparing such free-flowing granulations include the heat fusion method, the use of steam or water injection or the use of a double granulation method.

The heat fusion method consists of mixing the particular alkali metal carbonate or bicarbonate, or mixture, with the desired organic acid or combination of acids, which mixture should include monohydrated citric acid in an amount of from about 8 to 30% of the total acid present, placing the mixture in a suitable container and heating until the water of crystallization in the monohydrated citric acid present is released. This treatment causes a partial reaction and results in the formation of a plastic mass which, when broken down into coarse granules and then screened, dried and lubricated can be compressed into tablets.

The steam or water injection method of granulation is similar to the heat fusion method except that monohydrated citric acid does not have to be employed since the required moisture is added either in the form of steam or as water, which is sprayed or injected into the mixture as it is agitated. Heat is not essential in this method of forming the plastic mass which, after being broken up into coarse granules, is subsequently screened and dried. When employed for the production of tablets the granulated mixture is usually lubricated and the lubricated granulation compressed into tablets.

The double granulation method consists of preparing granules of the alkali metal carbonate or bicarbonate by moistening the latter with a solution of a binding material such as sugar, acacia, gelatin or lactose, screening the moist mixture to form granules and then drying the moist granules. A separate granulation is made in a like manner of the acid components. The medicinal or flavoring ingredients are then incorporated into either granulation or divided between said granulations, and the two granulations are then mixed in the proper formula proportions. For tablet formation by compression, the granulation mixture is lubricated prior to compression.

When the granulations obtained by the methods described are then tableted, the tablets formed are not always sufficiently hard for handling in subsequent packaging operations and, in general, are easily chipped, flaked apart or cracked. When greater pressure is employed in compression, other physical defects, such as capping, may occur. Not only are chipped, flaked or cracked tablets unmarketable but, in addition, when the breakage occurs during packaging operations, the tablet feeding and packaging mechanism is easily clogged and the frequent jamming greatly impairs the efficiency of the packaging operation.

Another difficulty commonly experienced in connection with effervescent tablets is the tendency of the intimate compressed mixture of acid and bicarbonate to react in the presence of moisture. To avoid this the tablets are compressed under conditions of low humidity and then packaged, or preferably, individually sealed in some moisture impervious material. While this is generally sufficient to overcome the readiness of the components to react at ordinary temperatures, at elevated temperatures even relatively small amounts of residual moisture will cause this reaction to take place with the production of carbon dioxide and the at least partial loss of effervescent characteristics. In the case of individually sealed tablets, the carbon dioxide released causes puffing or swelling of the sealed envelope containing the tablet rendering the package unsightly and unmerchantable. Other effervescent compositions either in granular or compressed tablet form, especially those which contain aspirin, are unusually prone to this kind of decomposition even when held at ordinary room temperature. Experience has shown that the presence of aspirin in these effervescent compositions apparently favors the reaction which results in releasing carbon dioxide within the package and, in an effervescent formula, aspirin will in fact catalyze a reaction yielding carbon dioxide even without any residual moisture content being present.

It is, therefore, an important object of this invention to provide improved effervescent compositions which are suitable for the preparation of tablets by compression methods and which on compression yield shaped tablets of substantially improved physical strength, heat resistance and chemical stability.

Another object of this invention is the provision of effervescent compositions containing aspirin which have little or no tendency to decompose with the production of carbon dioxide when exposed to elevated temperatures.

A further object of this invention is the preparation of stable effervescent tablets containing aspirin which when individually sealed in gas tight envelopes do not undergo any appreciable reaction so as to produce carbon dioxide.

Yet another object of this invention is the production of compressed effervescent tablets which are self-curing and acquire sufficient hardness for convenient handling without the addition of hardening components or special treatments.

Other objects of this invention will appear from the following detailed description.

It has now been found that effervescent compositions comprising an alkali metal bicarbonate and a non-toxic organic acid may be markedly stabilized if the alkali metal bicarbonate employed in forming said effervescent compositions is modified prior to use so as to convert a part of the alkali metal bicarbonate to the corresponding carbonate. This conversion may be carried out conveniently by employing a controlled heat treatment. During the heat treatment the bicarbonate may be exposed to temperatures of from 50 to 200° C. until the desired degree of conversion is effected. Usually, the desired degree of stability is attained if about 2 to about 10% by weight of the bicarbonate is converted in this fashion to the carbonate. The reaction which takes place during said heat treatment consists of two mols of the bicarbonate reacting to form one mol of the corresponding carbonate together with one mol each of water and carbon dioxide. The actual degree of conversion is readily determined by acid titration of the modified bicarbonate with sulfuric acid employing methyl orange as the indicator.

Sufficient movement and air circulation should be provided during the heat treatment so that all of the surfaces of the alkali metal bicarbonate particles being heat treated will be uniformly exposed and at the same time the carbon dioxide and water vapor formed as reaction products will be removed. Preferably the heating should be carried out at a temperature of 100° C. or higher to ensure the vaporization and removal of the water formed during the reaction. It is believed that the stabilization of the effervescent compositions formed with the modified bicarbonate results from the chemical change on the surface of the bicarbonate particles produced by the heat treatment. By providing sufficient circulation the outer surfaces of the alkali metal bicarbonate particles are apparently converted to the less active carbonate and the presence of the latter on the particle surfaces serves in part as a barrier to hinder any reaction with the organic acid in the mixture prior to the time the effervescent composition is added to water and dissolved in use. The improved stability characteristics of the effervescent mixtures prepared with said stabilized alkali metal bicarbonate are retained when these mixtures are subsequently tableted. In addition, it has also been observed that tablets prepared from these mixtures are self-hardening and upon being allowed to stand for about a week after tableting will go from a hardness of 3 to 4 on the Strong-Cobb scale (see U. S. Patent No. 2,645,936) to a hardness of 12 to 14 yet without any loss in solution time when added to water. Accordingly, no subsequent heat treatment or curing of the tablets is necessary to improve their hardness characteristics. The supplementary hardening agents heretofore employed as an aid in producing tablets which may be packaged successfully without undesirable chipping or cracking may be eliminated although they are still desirable for the flavor note they add. This is particularly applicable to the use of glycine. In the case of flavored tablets the elimination of any heat curing step substantially improves flavor retention since the more volatile of the flavor constituents present have no opportunity to escape as is the case where the tablets are exposed to elevated temperature when heat cured.

One very substantial advantage achieved by the process of this invention is the ability of the modified bicarbonate to yield an aspirin-containing effervescent composition which is quite stable in either granular or tablet form. Exposure of these aspirin-containing effervescent compositions to elevated temperatures of 45° C. produces little evidence of decomposition as measured by the degree of carbon dioxide formation. Since this thermal stability test is normally conducted with the composition in sealed packages any evidence of thermal decomposition is immediately apparent due to the puffing of the foiled package which is produced by any carbon dioxide formed.

Where the effervescent composition is formed of a mixture of an alkali metal bicarbonate such as sodium bicarbonate, and citric acid, the precise stoichiometric ratio of citric acid to sodium bicarbnate in the basic effervescent formulation is 192 parts by weight of anhydrous citric acid to 252 parts by weight of sodium bicarbonate, with three mols of sodium bicarbonate being necessary to neutralize each mol of citric acid. In the case of tartaric acid, only two mols of sodium bicarbonate are necessary to neutralize each molecule of tartaric acid. When a somewhat tart taste is desired in the product the acid is employed in excess. An excess of up to about 35% by weight of that theoretically required may be employed in such instances. Aside from this, the use of an excess of acid is not necessary and entirely satisfactory formulations are obtained where the exact stoichiometric ratio is employed. An excess of the alkali metal bicarbonate may also be desired where it is advantageous to maintain the formulation on the alkaline side, e.g. where aspirin is used and solubilization dictates that alkaline conditions be employed.

Tableting lubricants may be omitted from effervescent aspirin tablets since aspirin is a self-lubricant.

In order further to illustrate this invention but without being limited thereto the following examples are given:

*Example 1*

50 pounds of granular sodium bicarbonate are modified by heating in trays in a draft oven set at a temperature of 100° C. The total heating time employed is 45 minutes, the heating being divided into three 15 minute periods with the granular sodium bicarbonate being mixed thoroughly between each heating period. The modified material obtained is then stored immediately in air-tight containers to avoid any moisture absorption. When titrated with 1 N $H_2SO_4$ employing methyl orange as the indicator to determine the extent of the chemical change an average of about 7 to 9% by weight of the sodium bicarbonate is found to have been converted to sodium carbonate. The degree of conversion in the case of sodium bicarbonate is readily determined by the following equation:

$$\text{Wgt. sample in grams} = 84(E-X) + 53X$$

$E$ = equivalents of total acid required
$X$ = equivalents of acid required for $Na_2CO_3$ An equivalent degree of conversion is obtained in the case of potassium bicarbonate by heating in the same manner but at a temperature of 125° C.

As brought out above, the extent of the conversion of the bicarbonate to the carbonate is determined by the combination of time and temperature employed. Exposure to a temperature of 50 to 60° C. may require 48 hours or more for any significant degree of conversion to be effected whereas exposure to temperatures of 200° C. or more with suitable air circulation and agitation will cause a noticeable reaction in but minutes. The reaction conditions employed are merely adapted to the result desired so that if, for example, the conversion to sodium carbonate of a specific percent by weight of sodium bicarbonate is desired an almost infinite number of combinations of time and temperature are available. The higher the temperature the more rapidly the conversion. The ultimate result achieved with respect to the degree of conversion is, however, readily determined by means of the acid titration described. For effervescent compositions containing aspirin, a bicarbonate in which 7 to 9% by weight has been converted to the carbonate is preferable in order to produce a satisfactory, thermally stable effervescent composition. While stable effervescent compositions are also obtained with a sodium bicarbonate, for example, where as much as 20% by weight has been converted to the carbonate, the compositions thus formed are found to have a taste which is somewhat bitter and therefore objectionable but aside from this subjective factor the compositions and tablets made therefrom are quite satisfactory as far as their thermal stability is concerned.

*Example 2*

A flavored beverage tablet is formed of the following composition.

| Ingredients: | Parts by weight |
| --- | --- |
| Citric acid, anhy. | 18.26 |
| NaHCO$_3$, modified (7 to 9% conv.) | 12.74 |
| Glycine | 0.5 |
| Ascorbic acid | 0.25 |
| Sucaryl sodium | 2.0 |
| Saccharin sodium | 0.375 |
| Color | 0.125 |
| Sealva grape imit. flavor | 0.750 |

The glycine and citric acid are first mixed and to this mixture is added 0.1% by weight (on the total ingredients) of propylene glycol. The remainder of the ingredients are added, mixed well and 0.5% by weight of heavy mineral oil then added as a tableting lubricant. After thorough mixing, the composition is compressed into 36 grain tablets and the latter packaged by sealing in aluminum foil. The packaged tablets thus formed are found to be stable for from 5 to 10 days at a temperature of 70° C. without puffing whereas tablets formed in the same fashion without employing the modified bicarbonate are stable only for from 4 to 7 hours before puffing due to the formation of CO$_2$ within the sealed foil. A less drastic stability test and one more likely to be similar to conditions encountered in commercial operations consists of exposing the foil packaged tablets to a temperature of 45° C. Under these conditions the usual tablets commonly exhibit noticeable puffing in about 2 weeks whereas the tablets prepared in accordance with this invention show no sign of puffing even after exposure to 45° C. for three months.

*Example 3*

A flavored beverage tablet is formed of the following composition in the manner described in Example 2 above with propylene glycol and mineral oil being included.

| Ingredients: | Parts by weight |
| --- | --- |
| Citric acid, anhy. | 18.42 |
| NaHCO$_3$, modified | 13.05 |
| Glycine | 0.5 |
| Ascorbic acid | 0.25 |
| Sucaryl sodium | 1.75 |
| Saccharin sodium | 0.4375 |
| Color | 0.44 |
| Flavor (lemon-lime) | 0.094 |

The composition is compressed into tablets weighing 34 grains each. The thermal stability of the tablets obtained is similar to that of the tablets of Example 2.

*Example 4*

An effervescent therapeutic diuretic tablet is formed of the following composition as described above including the addition of propylene glycol and mineral oil.

| Ingredients: | Parts by weight |
| --- | --- |
| KHCO$_3$, modified | 1.856 |
| Hydrochlorothiazide | 0.025 |
| Saccharin, insoluble | 0.0125 |
| Calcium cyclamate | 0.05 |
| Orange flavor 3X | 0.05 |
| Orange color | 0.0025 |
| Citric acid, anhy. | 1.804 |
| Glycine | 0.05 |

The composition is compressed into tablets each weighing 3.85 grams and of excellent thermal stability at both 70° C. and 45° C. No puffing is observed after one week at 70° C. or one month at 45° C.

*Example 5*

Effervescent fifty grain analgesic tablets are prepared as described from the following composition.

| Ingredients: | Parts by weight |
| --- | --- |
| Acetanilid | 2.5 |
| Sodium bromide | 5.0 |
| Glycine | 0.75 |
| Caffeine, anhy. | 0.75 |
| NaHCO$_3$, modified | 23.25 |
| Citric acid, normal | 5.0 |
| Citric acid, anhy. | 12.75 |

All of the ingredients with the exception of the acetanilid are mixed together thoroughly, the acetanilid then added and the whole mixed. At 45° C. no puffing of the foil envelopes is observed even after exposure for three months.

*Example 6*

An effervescent denture cleanser tablet is prepared from the following composition as described in Example 2 including the addition of both propylene glycol and mineral oil.

| Ingredients: | Parts by weight |
| --- | --- |
| Citric acid, anhy. | 21.375 |
| Glycine | 0.5 |
| Glucone delta lactone | 6.0 |
| NaHCO$_3$, modified | 21.3 |
| Saccharin sodium | 0.125 |
| Disodium versenate | 0.0625 |
| Peppermint 3X | 0.375 |

The mixture is then compressed into approximately 50 grain tablets. The tablets are stable at 45° C. and no decomposition can be observed after one month's exposure.

*Example 7*

Effervescent aspirin tablets are formed of the following composition by mixing all of the ingredients except the aspirin, then adding the aspirin, mixing thoroughly and compressing into 50 grain tablets. The modified sodium bicarbonate employed in this and in the following examples is converted by heating until about 8% by weight has been converted to sodium carbonate.

| Ingredients: | Parts by weight |
| --- | --- |
| Aspirin, 100 mesh | 5.0 |
| Calcium gluconate | 0.5 |
| NaHCO$_3$, modified | 27.5 |
| Citric acid, anhy. | 16.25 |
| Glycine | 0.75 |

The tablets are individually sealed in aluminum foil and then placed in the 45° C. oven. A very slight expansion in the foiled package (one sixteenth inch) is noted after three weeks' exposure. Substantially, no further increase takes place on continued exposure for a total of nine weeks. Ordinary effervescent aspirin tablets prepared with unmodified sodium bicarbonate show immediate expansion and decomposition when heated at 45° C.

*Example 8*

An effervescent aspirin tablet is prepared as described in Example 7 from the following composition.

| Ingredients: | Parts by weight |
| --- | --- |
| Aspirin, 100 mesh | 5.0 |
| NaHCO$_3$, modified | 26.50 |
| Citric acid, anhy. | 16.25 |
| Glycine | 0.75 |
| Calcium phosphate, monobasic | 2.5 |

The tablets obtained show substantially no decomposition on exposure to a temperature of 45° C. for nine weeks and little more can be observed after fifteen weeks.

*Example 9*

An effervescent aspirin tablet is prepared as described in Example 7 from the following composition.

| Ingredients: | Parts by weight |
|---|---|
| Aspirin, 100 mesh | 5.0 |
| Calcium phosphate, monobasic | 2.5 |
| $NaHCO_3$, modified | 26.8 |
| Citric acid, anhy. | 15.7 |

The tablets obtained are stable at 45° C. for three weeks and sealed packages show at most an expansion of only about one-eighth inch even after twelve weeks.

*Example 10*

An effervescent aspirin tablet is prepared as described in Example 7 from the following composition.

| Ingredients: | Parts by weight |
|---|---|
| Aspirin, 100 mesh | 5.0 |
| Calcium gluconate | 0.5 |
| $NaHCO_3$, modified | 27.6 |
| Citric acid, anhy. | 16.9 |

These tablets sealed in foil show slight carbon dioxide formation after exposure at 45° C. for six weeks but no further change is observed after fifteen weeks' exposure.

*Example 11*

Highly stable effervescent aspirin tablets are obtained from the following composition.

| Ingredients: | Parts by weight |
|---|---|
| Aspirin, 80 mesh | 5.0 |
| $NaHCO_3$, modified | 25.1 |
| Citric acid, anhy. | 17.4 |
| $NaH_2PO_4$ | 2.5 |

*Example 12*

Each of the following compositions also yield highly stable effervescent aspirin compositions.

| Ingredients: | Parts by weight |
|---|---|
| Aspirin, 100 mesh | 5.0 |
| NaBr | 2.5 |
| KBr | 1.5 |
| Citric acid, anhy. | 15.3 |
| $NaHCO_3$, modified | 23.2 |
| $NaH_2PO_4$ | 2.5 |

| Ingredients: | Parts by weight |
|---|---|
| Aspirin, 80 mesh | 5.0 |
| Ascorbic acid | 2.0 |
| $NaH_2PO_4$ | 2.5 |
| Citric acid, anhy. | 15.3 |
| $NaHCO_3$, modified | 25.2 |

| Ingredients: | Parts by weight |
|---|---|
| Aspirin, 80 mesh | 1.25 |
| Sodium sucaryl | 0.19 |
| Sodium saccharin | 0.125 |
| Citric acid, anhy. | 3.20 |
| $NaHCO_3$, modified | 5.105 |

It is understood that the foregoing detailed description is given merely by way of illustration and that many variations may be made therein without departing from the spirit of my invention.

Having described my invention, what I desire to secure by Letters Patent is:

1. In a process for the production of improved compositions containing a non-toxic organic acid and an alkali metal bicarbonate which are reactive in aqueous solution to produce effervescence, the step consisting essentially of subjecting particles of said alkali metal bicarbonate to heat treatment with sufficient movement and air circulation prior to incorporation in said composition whereby at least part of the exposed surface of each particle is modified by conversion to the corresponding carbonate, said conversion being such that at least 2% by weight of the bicarbonate is converted to the carbonate.

2. Process in accordance with claim 1 wherein said bicarbonate is sodium bicarbonate.

3. Process in accordance with claim 1 wherein said bicarbonate is potassium bicarbonate.

4. Process in accordance with claim 1 wherein said non-toxic organic acid is a member of the group consisting of citric, tartaric and malic acid.

5. An effervescent composition comprising a mixture of a non-toxic organic acid and an alkali metal bicarbonate in which at least a part of the exposed surface of the particles of alkali metal bicarbonate in said mixture has been converted to the corresponding alkali metal carbonate.

6. Composition in accordance with claim 5 wherein said alkali metal bicarbonate is sodium bicarbonate.

7. Composition in accordance with claim 5 wherein said alkali metal bicarbonate is potassium bicarbonate.

8. An effervescent composition comprising a mixture of acetyl salicylic acid with a non-toxic organic acid and an alkali metal bicarbonate in which at least a part of the exposed surface of the particles of alkali metal bicarbonate in said mixture has been converted to the corresponding alkali metal carbonate.

9. Composition in accordance with claim 8 in which at least about 7% by weight of the bicarbonate particles are converted at their exposed surfaces to the carbonate.

10. The method of producing effervescent tablets of improved thermal stability and hardness consisting essentially of forming a powdered mixture of a non-toxic organic acid and an alkali metal bicarbonate which has been heat treated to convert at least a part of the exposed outer surfaces of the alkali metal bicarbonate particles to the corresponding alkali metal carbonate, adding a lubricant to said powdered mixture, and forming tablets from said mixture by compression.

11. The method of producing effervescent tablets of improved thermal stability and hardness which comprises forming a powdered mixture of a non-toxic organic acid of the group consisting of citric acid, tartaric acid and malic acid and an alkali metal bicarbonate which has been heat treated to convert at least a part of the exposed outer surfaces of the alkali metal bicarbonate particles to the corresponding alkali metal carbonate, adding a lubricant to said powdered mixture, and forming tablets from said mixture by compression.

12. The method of producing effervescent tablets of improved thermal stability and hardness which comprises forming a powdered mixture of acetyl salicylic acid, a non-toxic organic acid and an alkali metal bicarbonate which has been heat treated to convert at least a part of the exposed outer surfaces of the alkali metal bicarbonate particles to the corresponding alkali metal carbonate and forming tablets from said mixture by compression.

13. The method of producing effervescent tablets of improved thermal stability and hardness which comprises forming a powdered mixture of acetyl salicylic acid, a non-toxic organic acid and an alkali metal bicarbonate which has been heat treated to convert at least a part of the exposed outer surfaces of the alkali metal bicarbonate particles to the corresponding alkali metal carbonate said conversion being at least 7% by weight of the alkali metal bicarbonate and forming tablets from said mixture by compression.

References Cited in the file of this patent

UNITED STATES PATENTS

| 2,540,253 | Gakenheimer | Feb. 6, 1951 |
| 2,639,238 | Alther | May 19, 1953 |
| 2,985,562 | Millard | May 23, 1961 |